Nov. 25, 1952  W. R. PIERCE  2,619,132
CIRCULARLY-ADJUSTABLE HAND-HELD RECIPROCATING-BLADE SCROLL SAW
Filed Jan. 24, 1952
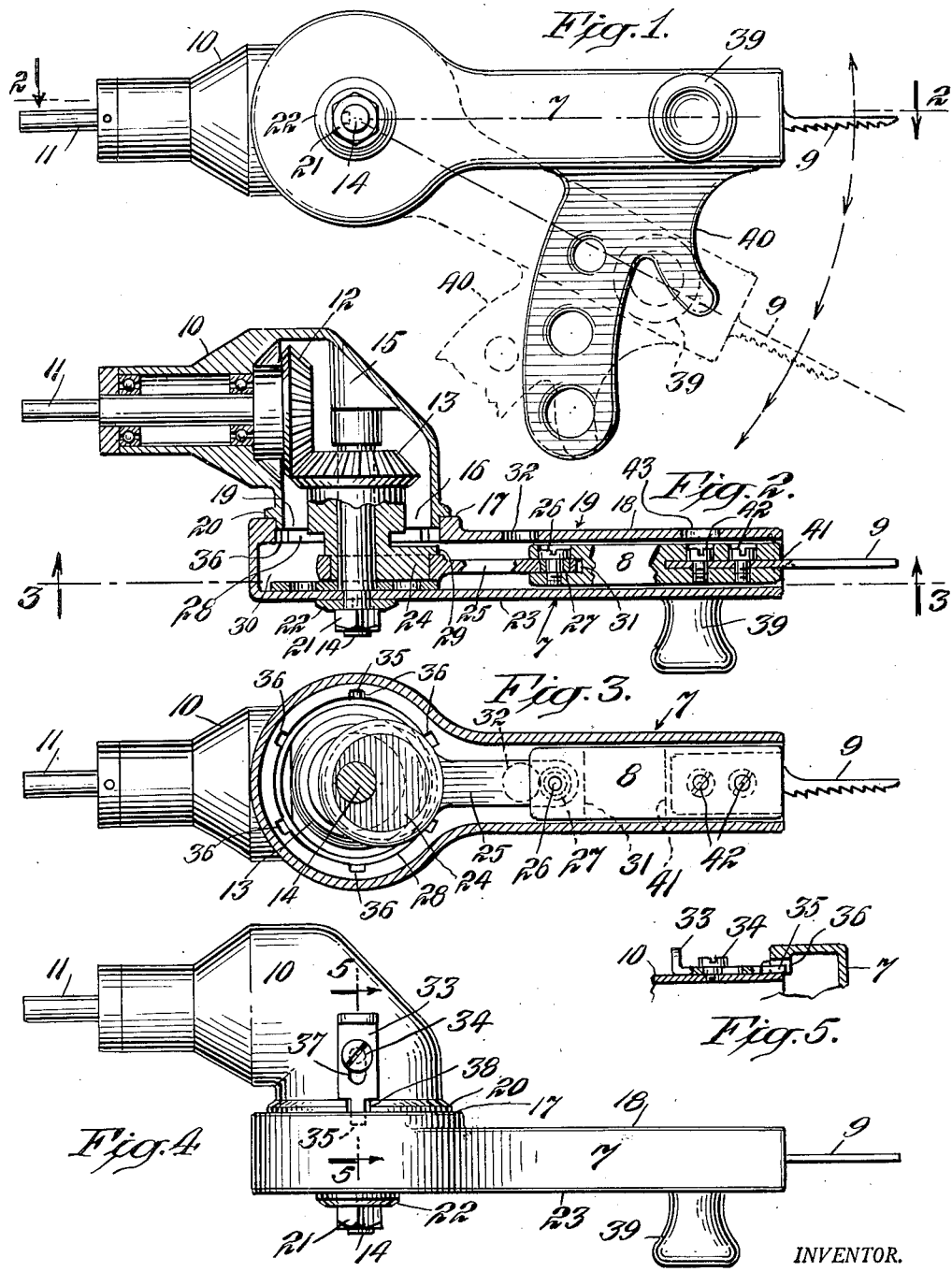
INVENTOR.
WILLIAM R. PIERCE
BY
ATTORNEY Patented Nov. 25, 1952

2,619,132

UNITED STATES PATENT OFFICE 2,619,132

CIRCULARLY-ADJUSTABLE HAND-HELD RECIPROCATING-BLADE SCROLL SAW

William R. Pierce, Long Branch, N. J.

Application January 24, 1952, Serial No. 268,026

4 Claims. (Cl. 143—63)

The invention herein disclosed is what may be termed a scroll-saw, and the general objects of the invention are to provide a device of this character, adapted to be attached to and driven by an electric drill or the like and which will be adjustable to carry the saw or other cutting tool operated by it angularly to the extent of a complete circle so as to reach in various otherwise inaccessible places.

Objects of the invention are to attain these results in a simple, practical, inexpensive structure, compact and small enough to be readily applied to and used with an electric drill or other such form of power unit.

Further special objects of the invention are to provide the mechanism indicated in a light weight form convenient for handling and using, and which will have a practically universal range of use, serving for scroll-saw, jack-saw, hacksaw, band-saw, crosscut and rip-saw purposes, or for such special uses as filing, drilling and the like.

Other desirable objects and the novel features through which the purposes of the invention are attained are set forth and will appear in the course of the following specification.

The drawing accompanying and forming part of the specification illustrates a present practical embodiment of the invention. Structure, however, may be modified and changed as regards this illustration, all within the true intent and broad scope of the invention as hereinafter defined and claimed.

Fig. 1 in the drawing is a side elevation of the saw, with dotted lines indicating the circular adjustment of the tool;

Fig. 2 is a longitudinal horizontal sectional view as on substantially the plane of line 2—2 of Fig. 1;

Fig. 3 is a vertical sectional view as on substantially the plane of line 3—3 of Fig. 2;

Fig. 4 is a plan view of the tool;

Fig. 5 is a broken sectional detail of the lock mechanism as on substantially the plane of line 5—5 of Fig. 4.

The body of the tool is made up of a sectional casing, an elongated front section 7 in which operates a reciprocating slide 8 carrying the saw 9 or other cutting element, and an angular rear section 10 carrying the rearwardly projecting shaft 11 and containing the bevel gears 12, 13.

These two sections of the casing are connected together by a swivel joint having as its axis the center of the bolt or stud 14 which secures the two sections together and which provides a bearing for the second gear 13.

As shown in Fig. 2, the bolt 14 is anchored in a base or seat 15 on the back wall of the angular casing section 10 and extends centrally out through the circular opening 16 in the side of this section. The gear 13 is journaled on this stationary bolt or stud and the opening 16 is large enough to freely admit gear 13 in the assembly of the parts.

The swivel connection between the two casing sections is completed by an annular bearing 17 on the inner side wall of the front section 7, rotatably engaged over the circular projecting flange 19 surrounding opening 16 and abutting thrust shoulder 20 provided on that flange.

A nut 21 on the outer threaded end of stud 14 and lock washer 22 keyed to the stud and bearing against the outer side wall 23 of section 7, rotatably secure the sections together.

The rotary movement of gear 13 is translated into reciprocatory movement of slide 8 through the medium of an eccentric 24 integral with or attached to this gear and an eccentric strap or link 25 pivotally connected to the inner end of the slide by a screw stud 26 and anti-friction bushing 27.

The circular opening 28 in the inner wall of the front casing section 7, which fits over the projecting flange 19 on the side of the rear casing section, is large enough to admit the eccentric 24 when the parts are assembled, as will be clear from Fig. 2.

The eccentric 24, as shown in Fig. 2, has a flange or shoulder 29 at the back or inner edge of the same for positioning the eccentric strap at that side, and the strap is held in place at the forward or front edge of the eccentric by thrust washer 30 resting against the outer wall of casing section 7 and loosely engaged over the bearing stud 14.

This construction provides for quick and easy assembly or disassembly of the parts. The eccentric link 25 may be entered through the large opening 28 in the inner wall of section 7, into the slot 31 in the inner end of the slide 8, and the pivot screw and bushing 26, 27, be entered through an opening 32 in the inner wall 18 of this section. Then, after placing the thrust washer 30 beneath the loop of the link, the eccentric 24 may be slipped into the loop and then the two sections engaged in a swiveled relation, with the stud 14 passing through gear 13 and eccentric until driven gear 13 meshes with drive gear 12 and the sections reach their full swiveling engagement at 17, 19, 20. The lock washer 22 and nut 21 may then be applied to the projecting end of the bolt to secure all the parts described in their fully assembled relation and with the forward casing section carrying the saw free to swing throughout a complete circle in respect to the rearward gear or drive section of the casing.

The bolt 14 serves the multiple purposes of securing the parts in this swiveled relation and of providing a bearing for the second gear and eccentric and, through outer wall of the front casing and washer 30, of holding the link 25 in place on the eccentric.

While the casing sections may be left free to swing one in respect to the other, it may be desirable for most purposes to lock them in any selected angular relation.

For this purpose there is provided a lock in the form of a slide 33, secured by screw 34 on the top of the rearward section, and having a projecting tongue 35 adapted to enter notches 36 in the rim of the opening 28 in the side of the casing section 7. A longitudinal slot 37 beneath the head of screw 34 permits this slide to be shifted sufficiently to engage these notches or to be free of the same. A notch 38 in the annular stop shoulder 20 serves as a guide for the tongue 35 and as a means for preventing rotative movement of the locking slide 33 on the screw 34.

A knob 39 projecting from the forward end of the front section facilitates the holding and adjusting of this section, and a pistol grip type of handle for this section is indicated at 40.

The saw blades, which may be of many types, are shown as removably secured in the slide 8 by being engaged in a slot 41 in the front or outer end of this slide and held in this relation by screws 42.

Saw blades of special design and for special purposes may be quickly inserted after taking out the pivot screw 26 and withdrawing the slide 8 far enough to reach the blade securing screws 42. Special blades in the nature of files, drills, centers and the like may be used in the tool simply by constructing them with a base portion to fit the securing means at 41, 42, on the slide.

The jointed or sectional casing may be completely enclosed except for the necessary opening where the saw blade or other tool element projects from the front of the casing.

The operating parts are therefore fully protected and may be readily kept in properly lubricated, operating condition.

The essential parts are relatively few in number and of practical, sturdy construction.

The unit as a whole may be quite small and light in weight, enabling it to be readily connected to an electric drill or the like by simply securing the projecting end of the drive shaft 11 in the chuck of such a drill. This drive shaft also, if desired, may be connected with a flexible drive shaft or other such driving medium.

It is contemplated also that the unit may be made up with a built-in motor incorporated, this being readily accomplished by simply enlarging the rear casing section 10 sufficiently to carry a small electric motor, either directly or gear connected with the drive shaft 11.

The complete circular adjustment provided by the swiveled casing construction permits the saw to be used for many purposes and in many places which would otherwise be inaccessible. These circular or angular adjustments may be made at any time, while the machine is running as well as when stopped.

An opening 43 in the inner wall 18 of the front casing section provides access to the screws 42, enabling blades to be changed without removing the reciprocating slide from the casing.

What is claimed is:

1. A circularly adjustable scroll-saw comprising front and rear casing sections swiveled together for circular adjustments of the front section with respect to the rear section, a drive shaft journaled in the rear section, a bevel gear on the inner end of said drive shaft, a bolt at the inner end of and disposed at a right angle to said shaft and pivotally securing the sections together in their swiveled relation, a second bevel gear journaled on said bolt in driven engagement with said first gear, an eccentric carried by said second gear and disposed within the forward section of the casing, a slide operating in the forward end of said front section and provided with means at the outer end of the same for removably securing a saw blade or other tool element and a link engaged with said eccentric and pivotally connected with the inner end of said slide.

2. A circularly adjustable scroll-saw comprising front and rear casing sections swiveled together for circular adjustments of the front section with respect to the rear section, a drive shaft journaled in the rear section, a bevel gear on the inner end of said drive shaft, a bolt at the inner end of and disposed at a right angle to said shaft and pivotally securing the sections together in their swiveled relation, a second bevel gear journaled on said bolt in driven engagement with said first gear, an eccentric carried by said second gear and disposed within the forward section of the casing, a slide operating in the forward end of said front section and provided with means at the outer end of the same for removably securing a saw blade or other tool element, a link engaged with said eccentric and pivotally connected with the inner end of said slide, and a locking slide mounted on one of said sections and engageable with the other section for securing the two sections in different angular relations.

3. A circularly adjustable scroll-saw comprising front and rear casing sections swiveled together for circular adjustments of the front section with respect to the rear section, a drive shaft journaled in the rear section, a bevel gear on the inner end of said drive shaft, a bolt at the inner end of and disposed at a right angle to said shaft and pivotally securing the sections together in their swiveled relation, a second bevel gear journaled on said bolt in driven engagement with said first gear, an eccentric carried by said second gear and disposed within the forward section of the casing, a slide operating in the forward end of said front section and provided with means at the outer end of the same for removably securing a saw blade or other tool element and a link engaged with said eccentric and pivotally connected with the inner end of said slide, said two casing sections having circular bearing flanges engaged in overlapping relation and of large enough diameter to pass the second bevel gear and eccentric.

4. A circularly adjustable scroll-saw comprising front and rear casing sections swiveled together for circular adjustments of the front section with respect to the rear section, a drive shaft journaled in the rear section, a bevel gear on the inner end of said drive shaft, a bolt at the inner end of and disposed at a right angle to said shaft and pivotally securing the sections together in their swiveled relation, a second bevel gear journaled on said bolt in driven engagement with said first gear, an eccentric carried by said second gear and disposed within the forward section of the casing, a slide operating in the forward end of said front section and provided with means at the outer end of the same for removably securing a saw blade or other tool element and a link engaged with said eccentric and pivotally connected with the inner end of said slide, said eccentric having an annular shoulder at the inner edge of the same and a thrust washer of larger diameter than the eccentric, engaged on the bolt and disposed at the outer edge of the eccentric to thereby retain the eccentric link in position thereon.

WILLIAM R. PIERCE.

REFERENCES CITED

The following references are of record in the file of this patent:

UNITED STATES PATENTS

| Number | Name | Date |
| --- | --- | --- |
| 1,785,574 | Black | Dec. 16, 1930 |
| 1,824,555 | Lathers | Sept. 22, 1931 |
| 2,122,611 | Kirby | July 5, 1938 |